Nov. 19, 1963  D. E. HOOVER  3,111,042
BOAT STEERING ASSEMBLY
Filed Aug. 25, 1961  2 Sheets-Sheet 1
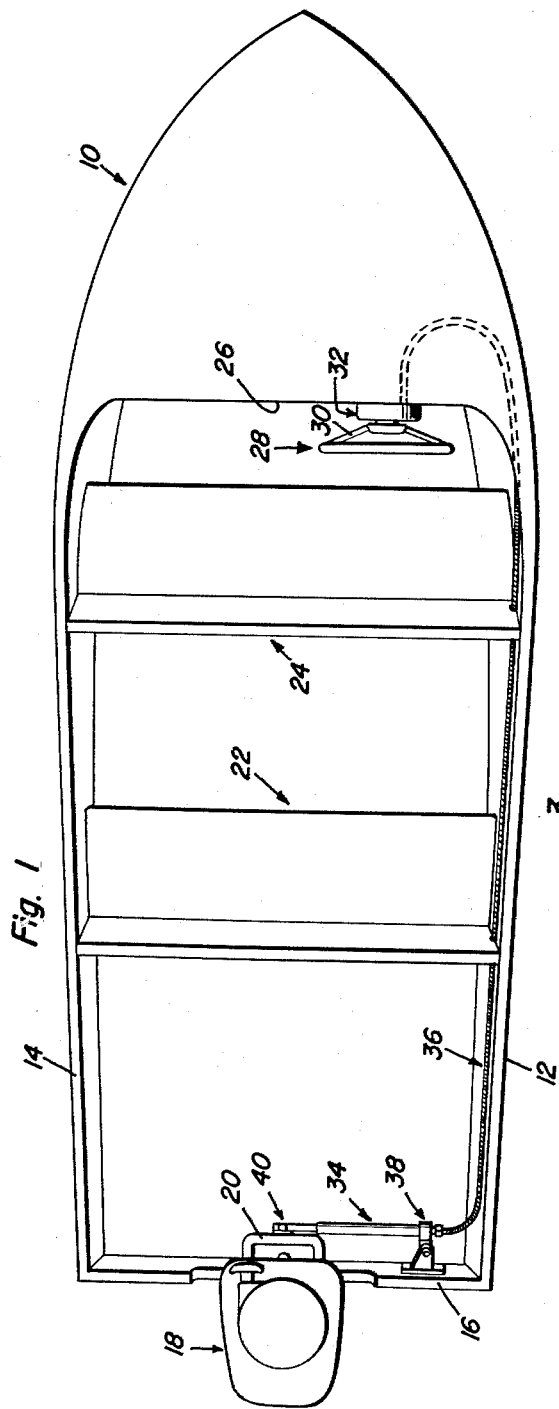
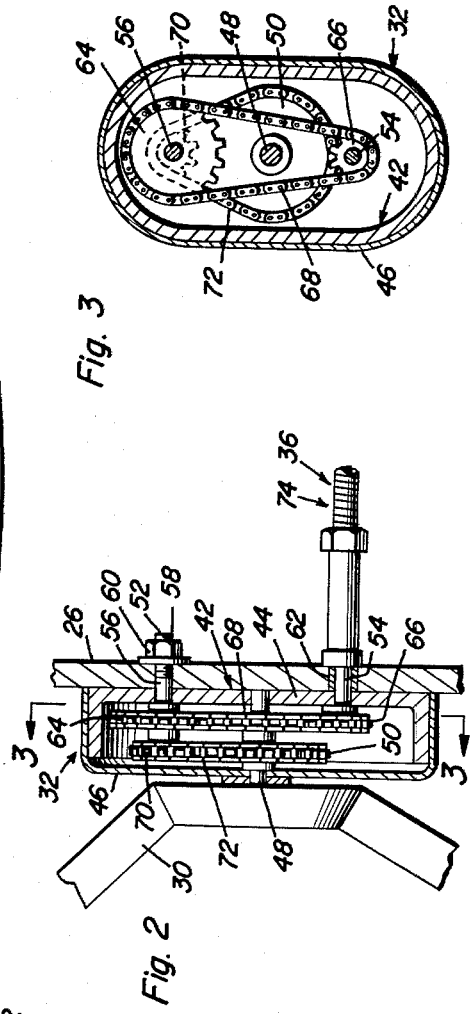
D. EUGENE HOOVER
INVENTOR.

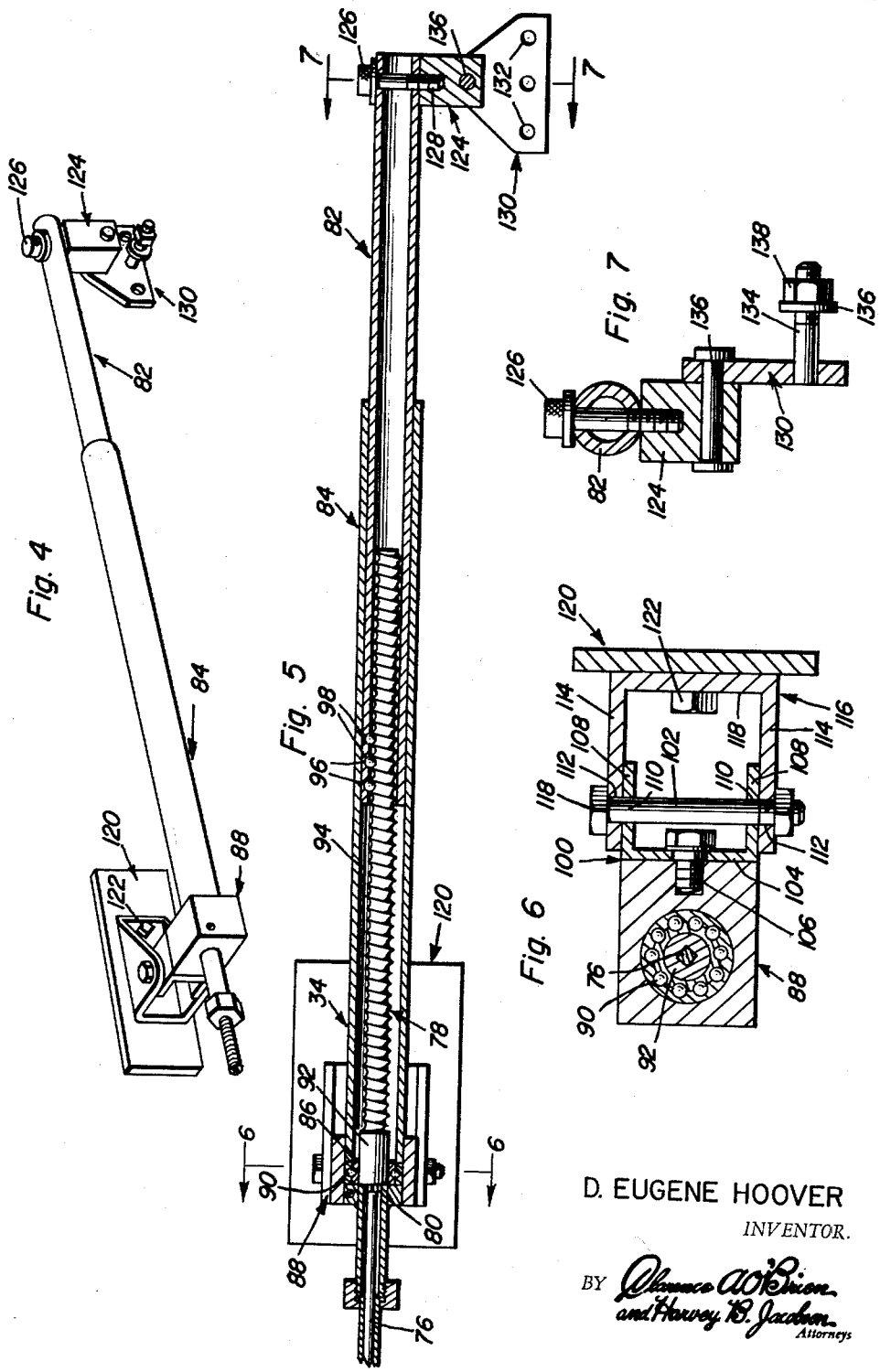

United States Patent Office 3,111,042
Patented Nov. 19, 1963

3,111,042
BOAT STEERING ASSEMBLY
D. Eugene Hoover, Miami, Fla., assignor, by mesne assignments, to Feathertouch Marine Equipment, Inc., a corporation of Florida
Filed Aug. 25, 1961, Ser. No. 133,850
12 Claims. (Cl. 74—509)

This invention relates to a novel and useful boat steering assembly and more specifically to a boat steering assembly which may be utilized to operate a pivotally mounted steering control of a motor boat propelled by a screw-type propeller and to substantially nullify any torque reaction effected by the screw-type propeller on the pivotally mounted steering control.

The boat steering assembly of the instant invention includes a steering wheel which is rotatably supported from a housing and one end of a flexible cable assembly is operatively connected to the steering wheel and includes a core member rotatably received within an outer flexible tubular casing. The core member is connected to the steering wheel for rotation therewith and the end of the core member remote from the steering wheel is operatively connected to an extensible motor. The extensible motor includes a jack screw and the core member is secured to the jack screw for rotation of the jack screw in response to rotation of the core member. The jack screw is rotatably journalled in one of the two telescopingly engaged first and second members comprising the extensible motor and follower means is carried by the other of the tubular members and is engaged with the screw member for movement therealong in response to rotation of the screw member.

The tubular members are only partially telescopingly engaged with each other and means is carried by one of the remote ends of telescopingly engaged members adapted for pivotal securement in a boat while means is carried by the other of the remote ends and is adapted for pivotally securing the other end to a pivotally mounted steering control of the boat. In this manner, upon rotation of the steering wheel the extensible motor may be extended and reduced in length so as to effect pivotal movement of the pivotally mounted steering control of the boat.

The main object of this invention is to provide a positive steering connection between a steering wheel assembly and the pivotally mounted steering control of a boat.

A further object of this invention is to provide a boat steering assembly which will substantially eliminate any possibility of the torque reaction of a screw-type of propeller on the pivotally mounted steering control of the boat from being transmitted to the steering wheel assembly of the boat steering assembly.

Another object of this invention is to provide a boat steering assembly in accordance with the preceding objects constructed in a manner whereby the steering wheel assembly thereof may be rotated with little effort to effect pivotal movement of the steering control to which it is operatively connected while any tendency of the steering control to be pivoted by a force effected other than by rotation of the steering wheel of the steering wheel assembly will be resisted thereby enabling the boat steering assembly to be adjusted as desired and then left unattended with the boat steering assembly itself maintaining the last adjusted positioning of the pivoted steering control of the boat to which it is secured.

A final object to be specifically enumerated herein is to provide a boat steering assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a conventional type of outboard runabout boat shown with the boat steering assembly of the instant invention mounted therein and operatively connected to an outboard motor carried by the transom of the boat;

FIGURE 2 is an enlarged fragmentary horizontal sectional view taken substantially upon a plane passing through the center of the steering wheel housing;

FIGURE 3 is a sectional view taken substantially upon the plane indicated by the section line 3—3 of FIGURE 2;

FIGURE 4 is a perspective view of the extensible motor of the boat steering assembly;

FIGURE 5 is a longitudinal sectional view taken substantially upon a plane passing through the longitudinal centerline of the extensible motor and on somewhat of an enlarged scale;

FIGURE 6 is an enlarged sectional view taken substantially upon the plane indicated by the section line 6—6 of FIGURE 5; and FIGURE 7 is a sectional view taken substantially upon the plane indicated by the section line 7—7 of FIGURE 5.

Referring now more specifically to the drawings the numeral 10 generally designates a conventional type of outboard runabout. The runabout 10 includes a pair of opposite sides 12 and 14 which are interconnected at the stern by means of a transom 16. An outboard motor generally referred to by the reference numeral 18 is dirigibly and tiltably mounted on the transom 16 and includes a steering handle 20 comprising a pivotally mounted steering control of the boat 10.

The boat 10 also includes a pair of seat assemblies generally referred to by the reference numerals 22 and 24 and a dashboard 26.

The boat steering assembly of the instant invention is generally referred to by the reference numeral 28 and includes a steering wheel 30 which is rotatably supported from a steering wheel housing generally referred to by the reference numeral 32. The housing 32 is secured to the dashboard 26 and the steering assembly also includes an extensible motor generally referred to by the reference numeral 34. A flexible cable assembly generally referred to by the reference numeral 36 is utilized to operatively connect the steering wheel 30 with the extensible motor 34 and it will be noted that first means generally referred to by the reference numeral 38 is carried by one end of the extensible motor 34 for pivotally securing that end to the transom 16 while second means generally referred to by the reference numeral 40 is carried by the other end of the extensible motor 34 and pivotally secures that end to the steering handle 20 of the outboard motor 18.

With attention now directed to FIGURES 1 through 3 of the drawings it will be noted that the housing 32 includes a generally cylindrical open face base referred to in general by the reference numeral 42 which includes an end wall 44. A cover 46 is provided for the open front of the base 42 and it will be noted that a steering wheel shaft 48 has its opposite ends supported from the cover 46 and base 42. The steering wheel 30 is rotatably supported by the end of the shaft 48 projecting outwardly of the cover 46 and a sprocket wheel 50 is mounted on the shaft 48 between the cover 46 and the end wall 44.

First and second shafts 52 and 54 are supported from the end wall 44 and it will be noted that the shaft 52 has a diametrically reduced portion 56 which extends through the end wall 44 and the dashboard 26 and is threaded at its extremity as at 58. A threaded fastener 60 is utilized to secure the first shaft 52 through the dashboard 26 in order to secure the base 42 to the dashboard 26.

The shaft 54 is journalled through the end wall 44 and is also rotatably received through a bushing 62 disposed through the dashboard 26.

A sprocket wheel 64 is rotatably journalled on the first shaft 52 and a sprocket wheel 66 is mounted on the second shaft 54. The sprocket wheels 64 and 66 are alined and drivingly connected by means of a link chain 68. The sprocket pulley 50 is alined with a sprocket pulley 70 which is also rotatably journalled on the first shaft 56. The sprocket pulleys 50 and 70 are drivingly connected by means of a link chain 72 and it will be noted that the pulley 70 is also drivingly connected to the pulley 64.

The flexible cable 36 includes an elongated flexible tubular outer casing generally referred to by the reference numeral 74 in which there is disposed an elongated and flexible core member 76. One end of the core member 76 is drivingly connected to the screw shaft 78 of the extensible motor 34 by means of a male and female socket connection 80, see FIGURE 5, and the other end of the core member 76 is drivingly connected to the shaft 54 in a similar manner.

With attention now directed to FIGURES 4 through 7 of the drawings it will be seen that the extensible motor 34 includes telescopingly engaged first and second members generally referred to by the reference numerals 82 and 84 respectively. Each of the members 82 and 84 is tubular and substantially circular in cross section.

One end of the first member 84 is secured in a bore 86 formed in a mounting block generally referred to by the reference numeral 88 and the bore 86 also has a thrust bearing 90 disposed therein rotatably supporting the cylindrical end portion 92 of the screw shaft 78. Accordingly, it may be seen that the screw shaft 78 is journalled in one end of the first member 84 and against axial displacement relative thereto.

The screw shaft 78 includes a spiral thread groove 94 which is generally semi-circular in cross section and follower means 96 is carried by one end of the second member 82. The second member 82 has inwardly opening semi-cylindrical pockets or recesses 98 formed therein and each of the follower means 96 comprises a ball bearing which is seatingly received in a corresponding recess 98 and disposed in rolling engagement with the corresponding portion of the groove 94.

It will be noted that the ball bearings 96 are spaced longitudinally of the second member 82 and also that they are spaced circumferentially about the second member 82.

Accordingly, upon rotation of the steering wheel 30, rotation or movement will be imparted to the screw shaft 78 which will in turn effect movement of the second member 82 relative to the first member 84.

It may be seen from FIGURES 4 and 6 of the drawings that the mounting block 88 is pivotally secured to a generally U-shaped member referred to in general by the reference numeral 100 by means of a fastener 102 passed through the bight portion 104 of the member 100 and threadedly engaged in a blind bore 106 formed in the mounting block 88.

Each of the legs 108 of the member 100 are provided with an aperture 110 and the apertures 110 are alined and registrable with a pair of corresponding apertures 112 formed in the legs 114 of a second U-shaped member generally referred to by the reference numeral 116. A pivot fastener 118 is secured through the registered apertures 110 and 112 and it will be noted that the bight portion 118 of the U-shaped member 116 is secured to a mounting plate generally referred to by the reference numeral 120 by means of fasteners 122 secured through the bight portion 118. Accordingly, it will be noted that the first member 84 is swivelly supported from the mounting plate 120.

It may now be seen that the extended end of the second member 82 is pivotally connected to a mounting block generally referred to by the reference numeral 124 by means of a pivot fastener 126 secured through the second member 82 and threadedly engaged in a blind bore 128 formed in the mounting block 124. The mounting block 124 is pivotally secured to a mounting plate generally referred to by the reference numeral 130 by means of a pivot fastener 132 and accordingly, it will be noted that the extended end of the second member 82 is swivelly supported from the mounting plate 130. The mounting plate 130 is provided with a pair of mounting apertures adapted to receive any suitable fasteners for securing the plate 130 to the steering handle 20 and it will also be observed that a stub shaft 134 is carried by and projects laterally outwardly from the mounting plate 130. The stub shaft has a washer 136 and a threaded fastener 138 mounted thereon and may also be used to secure the mounting plate 130 to the steering arm 120 or a corresponding portion of any pivotally mounted steering control of a boat.

By using the flexible cable assembly 36 whose core member 76 is provided with male and female socket members (not shown) on opposite ends, the flexible cable assembly 36 may be readily increased in length by the addition of a supplemental flexible cable section. This enables the steering assembly of the instant invention to be adapted to boats of different lengths with a minimum of cost which is not the case when a steering assembly is provided with a Bowden cable which may be increased in length only by replacing the existing cable with a longer cable.

The mounting plate 130 adapts the steering assembly 28 for use with all types of steering handles such as steering handle 20. The pair of apertures formed in the plate 130 adapt it for securement to the steering handle or bail of West Bend outboard motors and the stub shaft 134 adapts the plate 130 for securement to other steering handles or bails. Further the cylindrical end portion 92 of the screw shaft 78 may be provided with any convenient means (not shown) for preventing its axial displacement away from the first member 84 such as a snap ring disposed between the confronting faces of the member 84 and the bearing 90.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a boat having an outboard motor pivotally and tiltably secured thereto, a boat steering assembly comprising a steering wheel housing mounted in said boat adjacent the operator's position in said boat, a steering wheel rotatably supported from said housing, a flexible cable assembly including an elongated flexible tubular casing having an elongated flexible core member rotatably received therein, means operatively connecting one end of said core member to said steering wheel for rotation thereby, an elongated extensible motor including a pair of partially end overlapped first and second rigid members longitudinally extendable relative to each other, first means carried by one of the remote ends of said first and second members pivotally securing said one end to said boat and second means carried by the other of said remote ends pivotally securing said other end to a pivotally mounted steering control of said boat, a screw shaft rotatably supported from said first member and drivingly connected at one end portion to the other end of said core member, and follower means secured to said second member and operatively engaged with said screw shaft for movement there along in response to rotation of said screw shaft.

2. The combination of claim 1 wherein said first means includes means swivelly securing said one end to said boat.

3. The combination of claim 1 wherein said second means includes means swivelly securing said other end to said steering control.

4. The combination of claim 3 wherein said first means includes means swivelly securing said one end to said boat.

5. The combination of claim 1 wherein said screw shaft includes a spiral thread groove which is generally semi-circular in cross section, said follower means including a plurality of ball bearings rotatably supported from said second member projecting toward and rollingly seated in said thread groove.

6. The combination of claim 5 wherein said ball bearings are spaced longitudinally of and circumferentially of said second member.

7. The combination of claim 1 wherein said housing has a steering wheel shaft journalled therein, said steering wheel being mounted on said shaft, first and second shafts journalled in said housing for rotation about parallel axes spaced from and generally paralleling said steering wheel shaft, said connecting means including first means connecting said one end of said core with said second shaft for rotation therewith and second means drivingly connecting said wheel shaft to said first shaft and means drivingly connecting said first shaft to said second shaft.

8. The combination of claim 7 wherein said first connecting means includes a sprocket pulley secured to each of said steering and first shafts alined with each other and drivingly connected by means of a link chain.

9. The combination of claim 8 wherein said second connecting means includes a sprocket wheel secured to each of said first and second shafts alined with each other and drivingly connected by means of a link chain.

10. The combination of claim 1 wherein members are tubular, said second member being telescoped inside said first member and said screw shaft being journaled in said first member.

11. The combination of claim 10 wherein said tubular members are circular in cross section.

12. The combination of claim 11 wherein said screw shaft includes a spiral thread groove which is generally semi-circular in cross section, said follower means including a plurality of ball bearings rotatably supported from said second member projecting inwardly of the latter and rollingly seated in said thread groove, said second member having a plurality of inwardly opening semi-spherical recesses formed therein, said ball bearings being seated in said recesses.

References Cited in the file of this patent
UNITED STATES PATENTS

| | | |
|---|---|---|
| 2,488,917 | Kennedy et al. | Nov. 22, 1949 |
| 2,598,383 | Holzhauser | May 27, 1952 |
| 2,674,896 | Arones | Apr. 13, 1954 |
| 2,677,973 | Gosline | May 11, 1954 |
| 2,885,904 | Roberts | May 12, 1959 |
| 2,961,986 | Rockhill | Nov. 29, 1960 |
| 3,003,361 | Boutwell | Oct. 10, 1961 |